US 7,056,111 B2

(12) United States Patent
Kitamura et al.

(10) Patent No.: US 7,056,111 B2
(45) Date of Patent: Jun. 6, 2006

(54) POWDER PRESS FORMING APPARATUS AND METHOD OF POWDER PRESS FORMING

(75) Inventors: Makoto Kitamura, Omihachiman (JP); Yoshio Oda, Shiga-ken (JP); Shigeki Takahashi, Omihachiman (JP)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 10/000,012

(22) Filed: Dec. 4, 2001

(65) Prior Publication Data

US 2002/0068107 A1    Jun. 6, 2002

(30) Foreign Application Priority Data

Dec. 4, 2000    (JP)    ............... 2000-367967

(51) Int. Cl.
*B29C 43/08*    (2006.01)
(52) U.S. Cl. .................. 425/259; 425/216; 425/453; 425/345; 425/451.5
(58) Field of Classification Search ................ 425/259, 425/216, 215, 453, 345, 454, 219, 451, 405.1, 425/451.2, 451.5, 451.7, 352, 258, 260, 422, 425/432, 444, 436 RM
See application file for complete search history.

(56) References Cited

U.S. PATENT DOCUMENTS

| | | | | |
|---|---|---|---|---|
| 3,663,147 A | * | 5/1972 | Maekawa et al. | ........... 425/345 |
| 3,677,673 A | * | 7/1972 | Shapiro | ....................... 425/345 |
| 4,789,323 A | * | 12/1988 | Hudson | ....................... 425/352 |
| 5,037,287 A | * | 8/1991 | Hirai | ........................... 425/352 |
| 5,350,548 A | * | 9/1994 | Hinzpeter et al. | .......... 425/345 |
| 5,364,253 A | * | 11/1994 | Kojima et al. | ........... 425/451.9 |
| 5,647,410 A | * | 7/1997 | Nakagawa et al. | ........... 141/67 |
| 5,653,926 A | * | 8/1997 | Bogue et al. | ................ 425/352 |
| 5,686,118 A | * | 11/1997 | Kurata | ........................ 425/345 |
| 6,881,048 B1 | * | 4/2005 | Tokita | ........................... 425/78 |

FOREIGN PATENT DOCUMENTS

| | | |
|---|---|---|
| JP | 3-114699 | 5/1991 |
| JP | 5-57496 | 3/1993 |
| JP | 8-19588 | 1/1996 |
| JP | 2695757 | 1/1998 |
| JP | 2000-141097 | 5/2000 |

OTHER PUBLICATIONS

Japanese Examination Report dated Jun. 28, 2005 and English translation.

* cited by examiner

*Primary Examiner*—Duane Smith
*Assistant Examiner*—Thu Khanh T. Nguyen
(74) *Attorney, Agent, or Firm*—Buchanan Ingersoll PC

(57) ABSTRACT

A dry forming apparatus includes a carrying table (mold-transfer mechanism) which transfers a mold containing a die and punch units at least between a powder supply stage, a pressing stage, and a formed-product removing stage, a pressing driving mechanism which drives the punch units for pressing in the pressing stage, a connecting mechanism which connects punch units to the pressing driving mechanism when the mold is transferred to the pressing stage, and releases the connection of the punch units, and a unit holding mechanism which holds the punch units while the units are transferred to the next stage.

17 Claims, 9 Drawing Sheets

POWDER PRESS FORMING APPARATUS AND METHOD OF POWDER PRESS FORMING

This application is related and claims priority under 35 U.S.C. § 119 to Japanese Patent Application No. 2000-367967 filed Dec. 4, 2000, the entirety of which is incorporated by reference.

BACKGROUND OF THE INVENTION

1. Field of the Invention

The present invention relates to a powder press forming apparatus in which powdery raw materials of ceramics, and those for use in foodstuffs and chemicals, are dry-pressed by use of a mold including a die and punch units, and to a method of dry-pressing.

2. Description of the Related Art

Such a powder press forming apparatus is proposed, e.g., in Japanese Patent Publication No. 2695757. In this powder press forming apparatus, a rotary disk having a plurality of molds disposed thereon is moved to a powder supplying zone, a compressing zone, and a product-removing zone sequentially in the order by means of a cam follower and a guide rail. In the compressing zone, powder is compressed by making the upper and lower punches of the mold pass upper and lower rolls.

The conventional powder press forming apparatus employs a structure in which the transfer and positioning of the mold are carried out by means of the cam follower and the guide rail. Thus, the positional accuracy at forming is low, and furthermore, it is difficult to accurately control the height of the punch unit. In some cases, the apparatus can not cope with the continuous production of different types of products.

SUMMARY OF THE INVENTION

In view of the foregoing recent situations, it is an object of the present invention to provide a powder press forming apparatus of which the positional accuracy and the height accuracy of the punch unit at forming can be enhanced and which can cope with the continuous production of different types of formed products, and also a method of powder press forming.

To achieve the above-described objects, according to the pressing stage, there is provided a dry forming apparatus which includes a mold-transfer mechanism which transfers a mold containing a die and punch units at least between a powder supply stage, a pressing stage, and a formed-product removing stage, a pressing driving mechanism which drives the punch units for pressing in the pressing stage, a connecting mechanism which connects punch units to the pressing driving mechanism when the mold is transferred to the pressing stage, and releases the connection of the punch units, and a unit holding mechanism which holds the punch units while the units are transferred to the next stage.

Preferably, the dry forming apparatus further includes, in the powder supply stage, a charging driving mechanism which drives the punch units to form a space to be filled with powder, a connecting mechanism which connects the punch units to the charging driving mechanism when the mold is transferred to the powder supply stage, and releases the connection of the punch units when the mold is transferred to the next stage, and a unit holding mechanism which holds the punch units while the mold is transferred to the next stage.

Preferably, the dry forming apparatus further includes in the formed-product removing stage to take out the formed product, a taking-out mechanism which drives the punch units, a connecting mechanism which connects the punch units to the taking-out driving mechanism when the mold is transferred to the formed-product removing stage, and releases the connection of the punch units when the mold is transferred to the next stage, and a unit holding mechanism which holds the punch units while the mold is transferred to the next stage.

Preferably, the connecting mechanism is provided for the pressing driving mechanism, the charging driving mechanism, and the taking-out driving mechanism, whereby the punch units are driven by the pressing driving mechanism, the charging driving mechanism, and the taking-out driving mechanism via the connecting mechanism.

Preferably, the connecting mechanism includes clamp bodies arranged in and fixed to each of the pressing driving mechanism, the charging driving mechanism, and the taking-out mechanism, sliding claws movably supported by the clamping bodies, respectively, and an advancing-receding driving mechanism which advances or recedes each of the sliding claws between a clamping position at which the punch units are clamped and an unclamping position at which the clamping is released.

Preferably, the punch units include an upper punch unit including at least first and second upper-punches and a lower punch unit including at least first and second lower-punches, the punch units being opposed to each other via the die, and the pressing driving mechanism includes driving shafts connected to the first and second upper-punches and the first and second lower-punches, respectively, and actuators which independently drive the driving shafts.

Preferably, the lower punch unit includes at least first and second lower-punches, and the charging driving mechanism and the taking-out driving mechanism each include driving shafts connected to the first and second lower-punches and actuators which independently drive the driving shafts.

Preferably, each driving shaft includes a strut and a ball screw screwed into the strut, the punch unit is connected to the strut, and the actuator is connected to the ball screw.

Preferably, the actuator includes a servomotor, whereby the rotation of the servomotor is transmitted to the ball screw via a timing belt.

Preferably, at least the driving shafts for the first and second upper punches each include a coaxial multi-shat structure in which an inner cylinder is inserted into an outer cylinder relatively movably in the axial direction, whereby the first and second punch upper-punches can be independently driven by the relative movement of the outer and inner cylinders.

Preferably, the mold-transfer mechanism has the structure in which the mold is transferred to any one of the stages by rotation of a rotary table.

Preferably, the mold-transfer mechanism has the structure in which the mold is transferred to any one of the stages by linear movement of a linear table.

Preferably, the unit-holding mechanism is formed so as to hold the punch units, interlocking with the clamp-releasing operation when the connecting mechanism releases the clamping of the punch units, and to release the holding of the punch units, interlocking with the clamping operation when the connecting mechanism clamps the punch units.

Preferably, a powder charging mechanism which charges a powdery raw material into the space to be dry-formed of the die is provided in the powder supply stage, and a formed-product taking-out mechanism which takes out a pressing-formed product from the mold is provided in the formed-product removing stage.

Preferably, a machining stage in which a pressing-formed product is machined is provided between the pressing stage and the formed-product removing stage.

Preferably, a cleaning stage in which powder adhering to the die and the punch units is removed is provided next to the formed-product removing stage.

Moreover, according to the pressing stage, there is provided a method of powder press forming to produce a formed-product by which a mold containing a die and punch units is transferred at least to a powder supply stage, a pressing stage, and a formed-product removing stage in the order, including the steps of: in the powder supply stage, charging powder into the mold, and transferring the mold to the pressing stage while the mold is being held; in the pressing stage, positioning the mold in which the mold is fixedly located is simultaneously interlocked with a pressing driving unit, and the holding of the punch units is released, powder press forming in which the mold is driven by the pressing driving unit to press the powder, and transferring the mold in which the fixed positioning of the mold is released, simultaneously, the pressing driving unit is released, and the mold while it is held is transferred to the formed-product removing stage; and taking out the formed product from the die in the formed-product removing stage.

Preferably, the method further includes the steps of, in the powder supply stage, positioning the mold in which the mold is fixedly located, and simultaneously is connected to a charging driving mechanism, and the holding of the punch units is released, forming a charge space in which the mold is driven by the charging driving mechanism to form the charge space to be filled with powder, charging the powder into the mold, and transferring the mold in which the fixed positioning of the mold is released, and is released from the charging driving mechanism, and the mold is transferred to the pressing stage while the mold is held.

Preferably, the method of dry forming further includes the steps of, in the formed-product removing stage, positioning the mold in which the mold is fixedly located, and is connected to a taking-out driving mechanism, and the holding of the punch units is released, taking out the formed product in which the mold is driven by the taking-out driving mechanism to take out the formed product from the die, and transferring the mold in which the fixed positioning of the mold is released, the mold is released form the taking-out driving mechanism, and the mold is transferred to the next stage.

According to the present invention, the punch units are connected to the pressing driving mechanism by means of the connecting mechanism disposed in the pressing stage. Thus, the positional accuracy and the height accuracy of the punch units at forming can be enhanced. Thus, the apparatus can cope with continuous production of different types of products.

Moreover, when the mold is transferred, the interlocking of the punch units are released, and the punch units are held. Thus, the mold can be transferred while the postures of the punch units are held. Thus, the punch units can be prevented from shifting or falling during transfer.

Preferably, the punch units are connected to the charging driving mechanism by means of the connecting mechanism in the powder supply stage. Thus, the space to be charged with powder can be formed easily, highly accurately. Also, the punch units can be prevented from falling during transfer.

Preferably, the punch units are connected to the taking-out driving mechanism by means of the connecting mechanism in the formed-product removing stage. Thus, the formed-product can be taken out easily without damages to the product. Moreover, the product can be prevented from falling during transfer.

Preferably, the punch units are driven by the driving mechanisms via the connecting mechanism. Thus, the pressing operation can be carried out continuously to the positioning of the punch units.

Preferably, the punch units are clamped by advancement or recession of the sliding claws of the clamp bodies fixed to the respective driving mechanisms. Thus, the positioning can be performed by using the simple structure. Increased costs can thereby be inhibited.

Preferably, driving shafts are connected to the first and second upper-punches, and are independently driven by actuators. Thus, the density of the pressing-formed product can be made uniform. The flexibility of the shape and size of the formed-product can be enhanced.

Preferably, each driving shaft includes a strut and a ball screw screwed into the strut. Thus, the accuracy of the strokes of the punch units can be enhanced. Moreover, backlash can be eliminated, and the qualities and dimensional accuracy of a formed-product can be enhanced.

Preferably, the rotation of the servomotor is transmitted to the ball screw via a timing belt. Thus, similarly, the reliability of a formed-product on the qualities and dimensional accuracy can be enhanced.

Preferably, the driving shafts have a coaxial multi-shaft structure in which an inner cylinder is inserted into an outer cylinder relatively movably in the axial direction. Thus, the space required for arrangement of the driving shafts can be decreased. This contributes to reduction in size of the whole apparatus.

Preferably, the mold is transferred to the respective stages by rotation of a rotary table. Thus, the continuous production of formed-products can be realized. The whole of the apparatus can be compacted.

Preferably, the mold is transferred to the respective stages by linear movement of a linear table. The continuous production of formed-products can be realized by the reciprocation of the linear table.

Preferably, the punch units are held, interlocking with the connection-releasing operation, and the holding of the punch units is released, interlocking with the connection operation. Thus, the punch units can be transferred to the next stage while the punch units are held at the connection positions, respectively. The positional accuracy of the punch units can be maintained on a high level.

Preferably, a powder charging mechanism which charges a powdery raw material into the die is provided in the powder supply stage, and a formed-product taking-out mechanism which takes out a pressing-formed product from the die is provided in the formed-product removing stage. Thus, continuous production can be realized by automation. Production cost can also be reduced.

Preferably, a machining stage is provided between the pressing stage and the formed-product removing stage. Accordingly, drilling, deburring or the like of the formed product can be continuously conducted. A separate machining process becomes unnecessary. Production efficiency can be enhanced.

Preferably, a cleaning stage, in which powder adhering to the die and the punch units is removed, is provided after the formed-product removing stage. Accordingly, production efficiency is high compared to the case in which the apparatus is stopped to be cleaned.

According to the present invention, the mold having powder charged therein is transferred to the pressing stage while the mold is held. In the pressing stage, the mold is fixedly located and simultaneously interlocked with a pressing driving unit, and the pressing is carried out by the pressing driving unit. Thus, the flexibility of the forming process can be enhanced, and this method can cope with the continuous production of different types of formed-products.

Preferably, in the powder supply stage, the mold is fixedly located, and simultaneously is connected to a charging driving mechanism, the holding of the punch units is released, and the mold is driven by the charging driving mechanism to form the charge space to be charged with powder. Thus, the space for charging powder can easily be formed highly accurately. Moreover, the mold can be prevented from falling during transfer.

Preferably, in the formed-product removing stage, the mold is fixedly located, and is connected to a taking-put driving mechanism, the holding of the punch units is released, and the mold is driven by the taking-out driving mechanism to take out the formed product from the die. Thus, the formed product can be taken out easily without damages. Moreover, the mold can be prevented from falling during transfer.

DESCRIPTION OF THE PREFERRED EMBODIMENTS

Hereinafter, embodiments of the present invention will be described with reference to the accompanying drawings.

Figure 1:
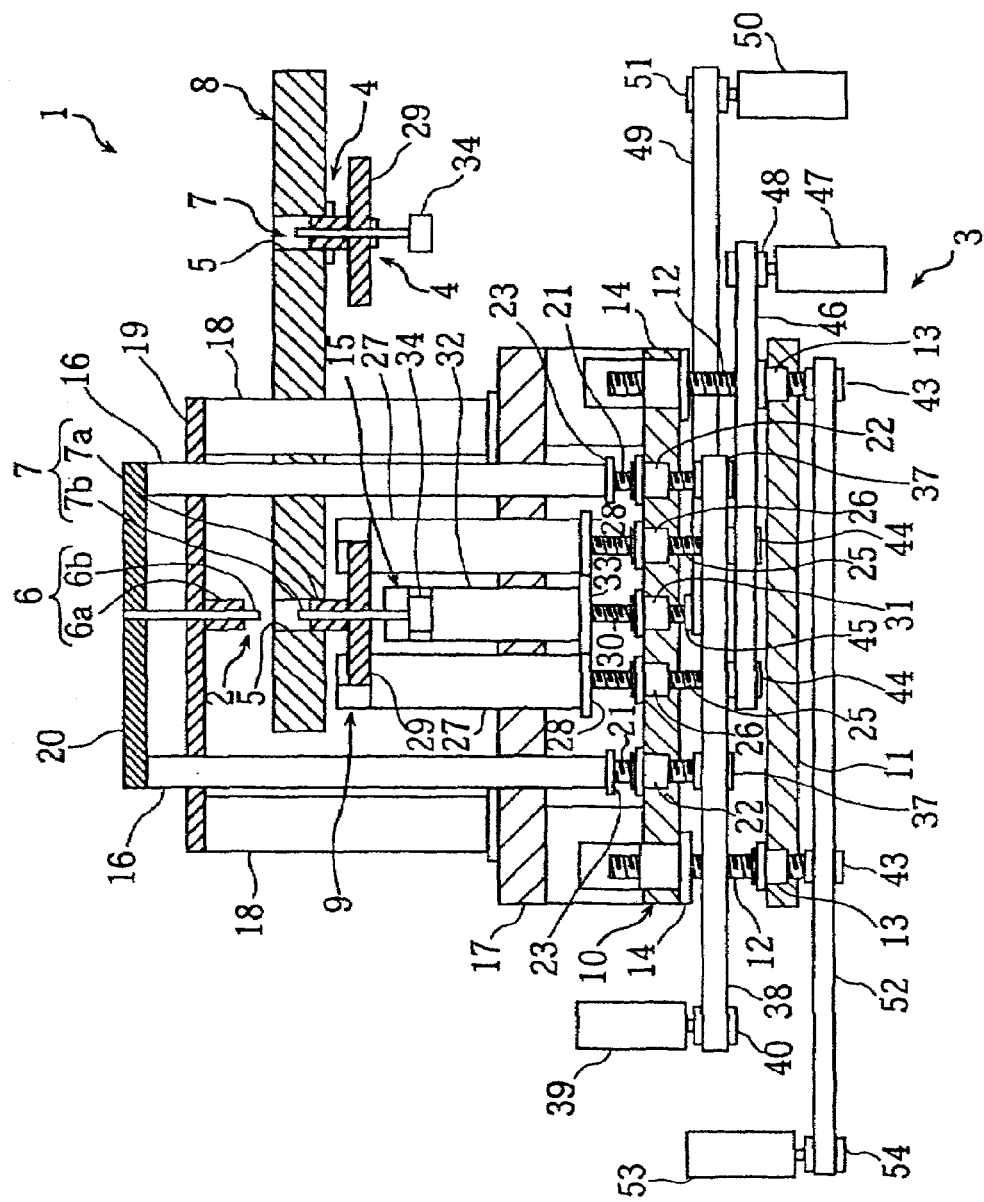
FIG. 1 schematically shows the structure of a dry forming apparatus according to a first embodiment of the present invention.
Figure 2:
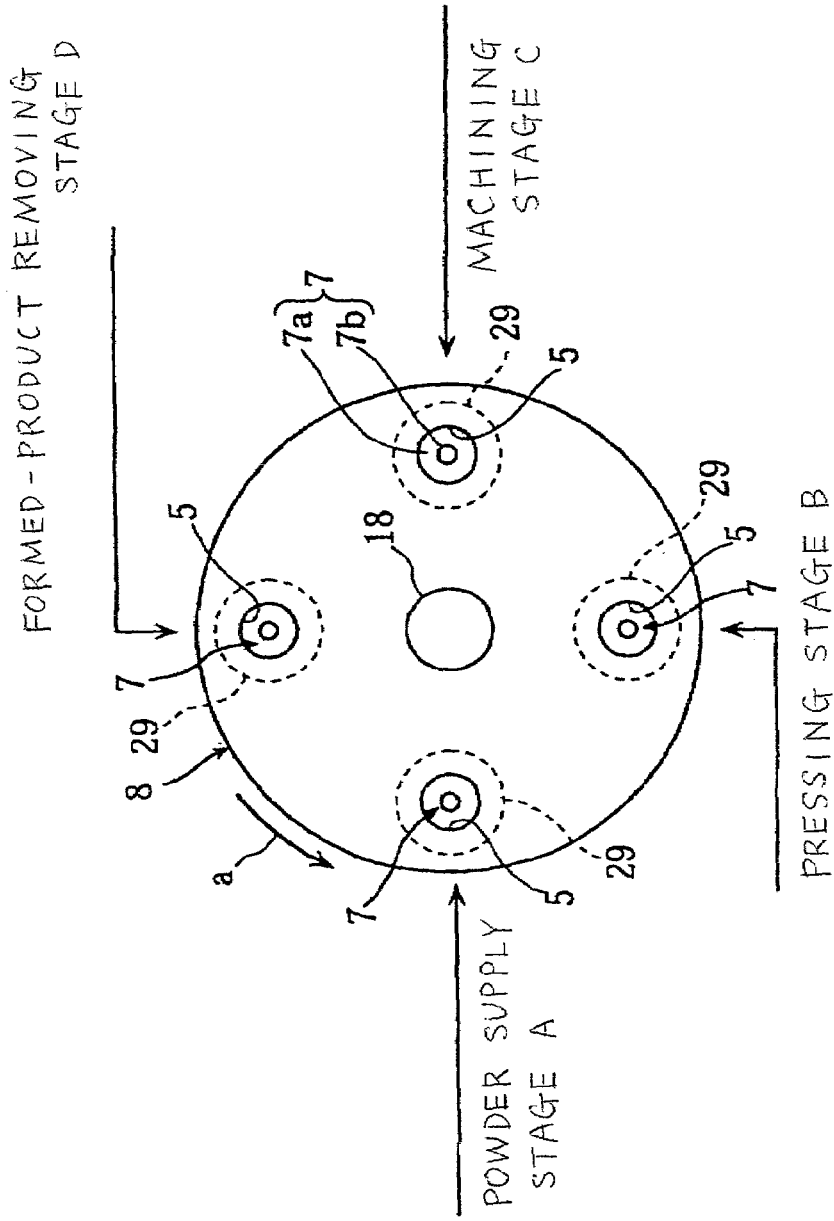
FIG. 2 is a plan view showing the operation of a carrying table of the dry forming apparatus.
Figure 3:
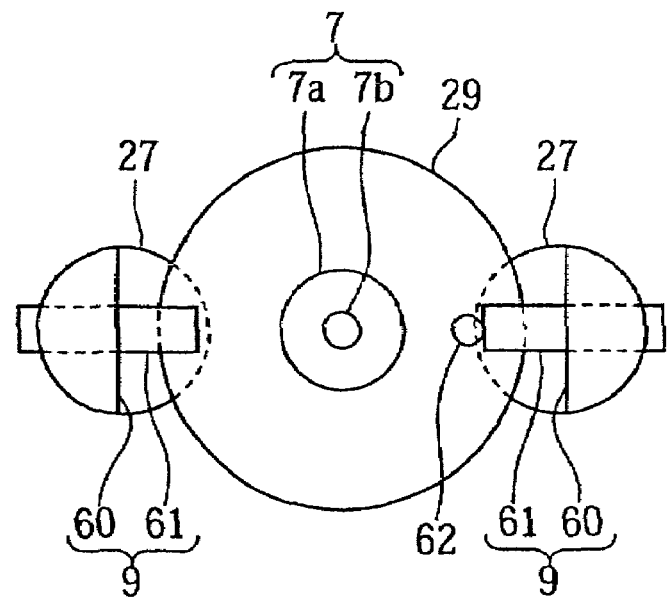
FIG. 3 is a plan view of first and second connecting mechanisms of the dry forming apparatus.
Figure 4:
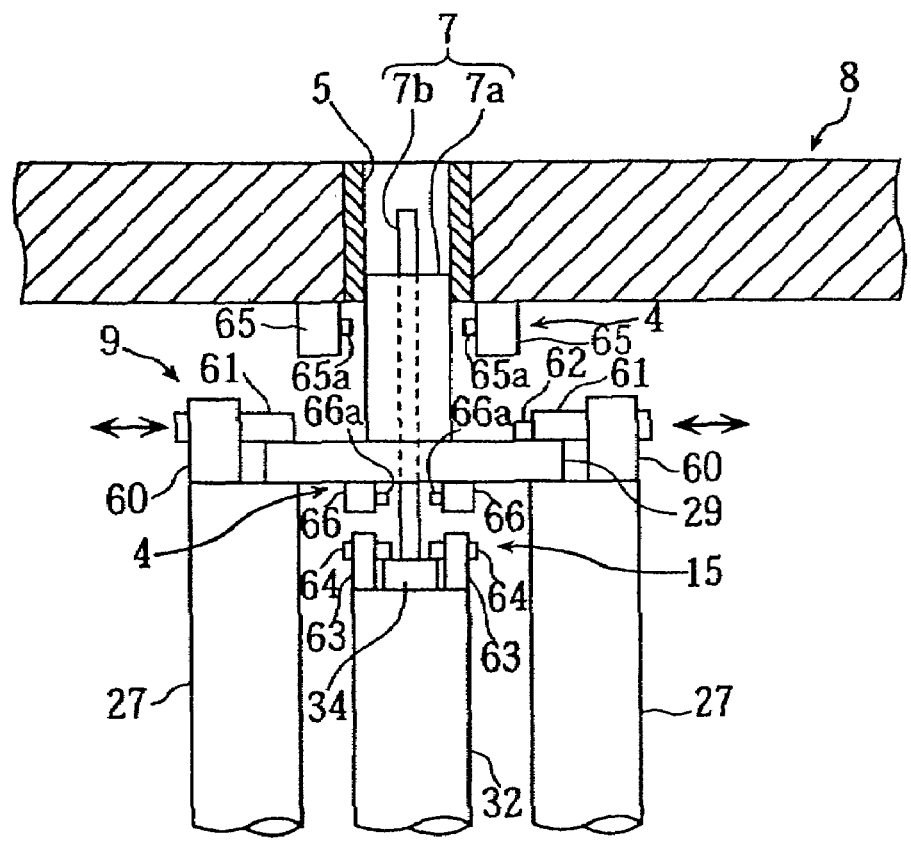
FIG. 4 is a plan view showing the clamping state of the first and second connecting mechanisms.
Figure 5:
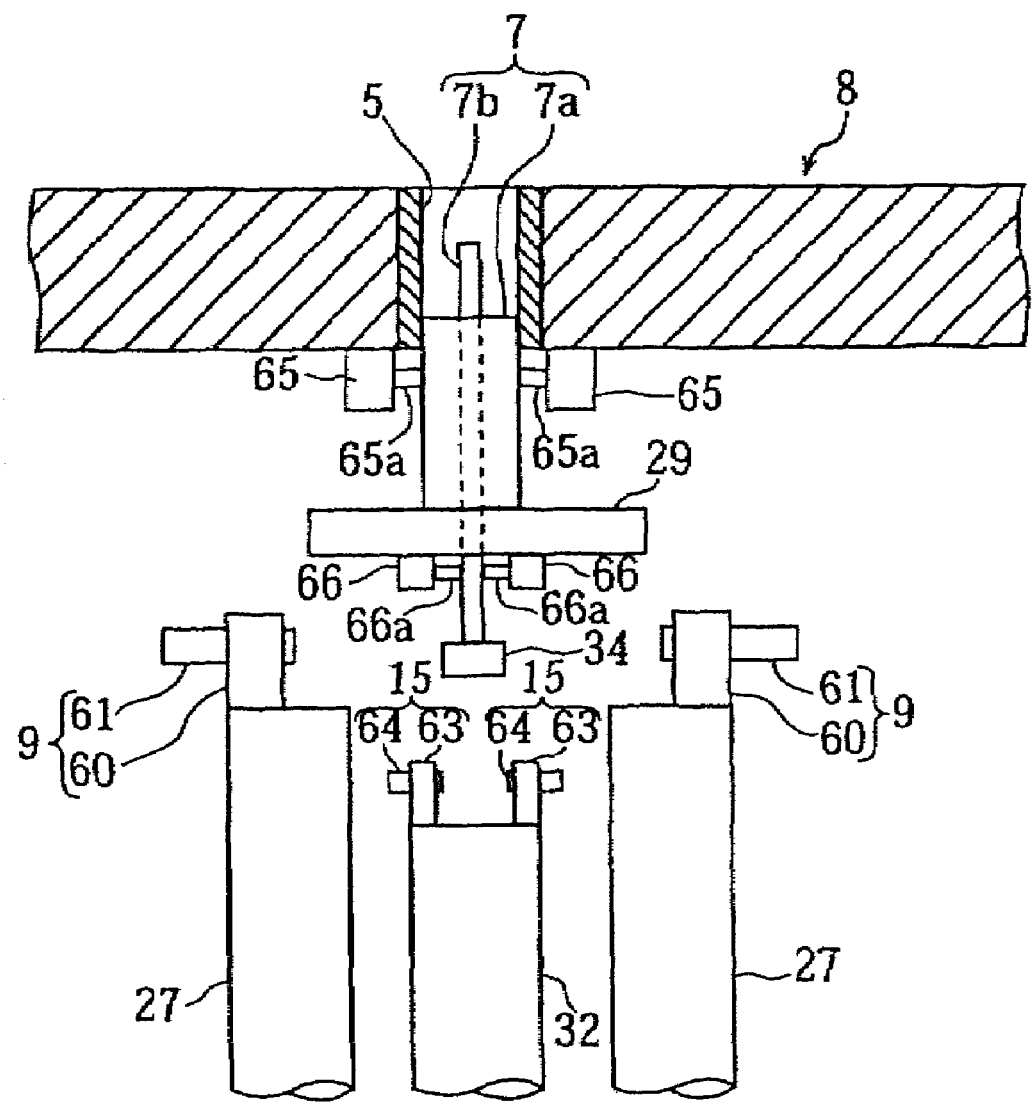
FIG. 5 is a plan view showing the unclamping state of the first and second connecting mechanisms.
Figure 6:
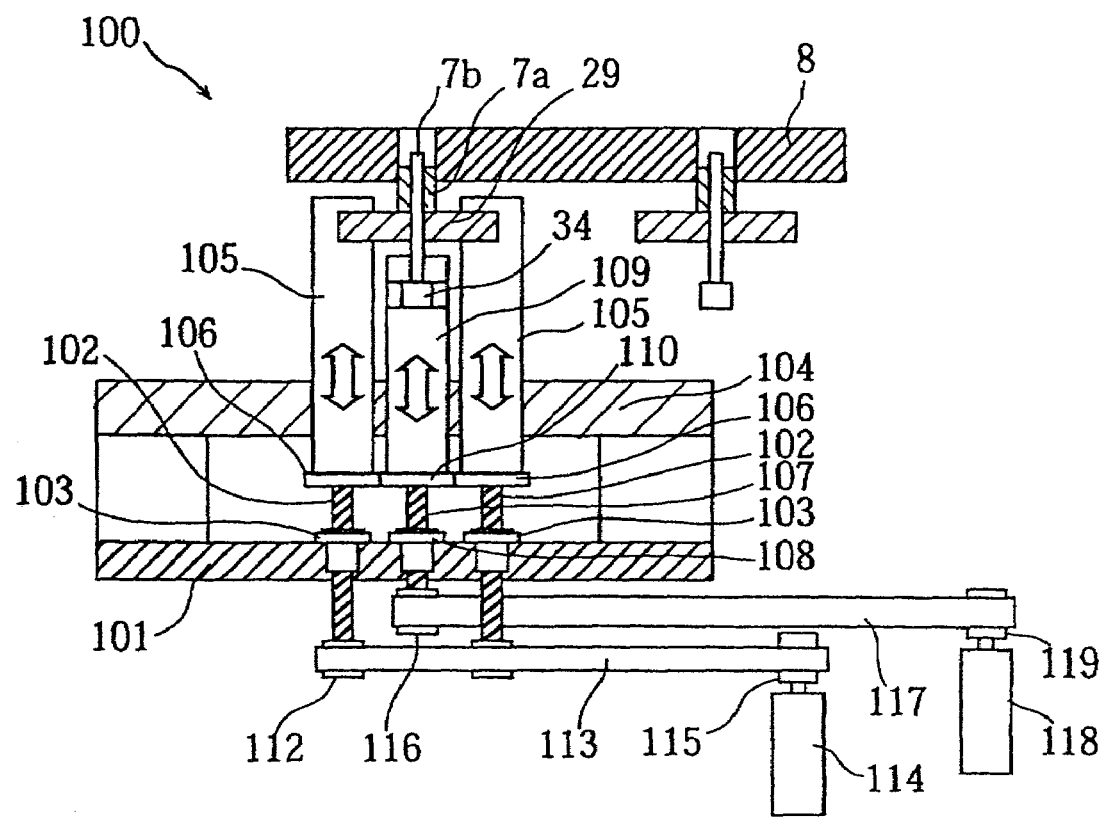
FIG. 6 illustrates the structure of a powder charging driving mechanism of the dry forming apparatus.
Figure 7B:
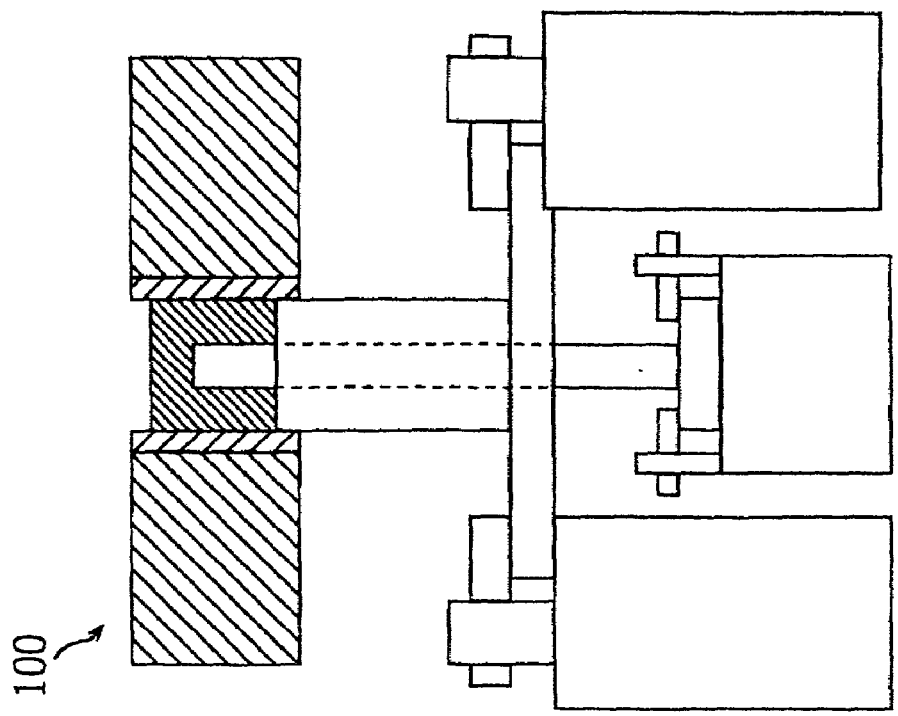
FIGS. 7A and 7B illustrate the operation of the dry forming apparatus.
Figure 7A:
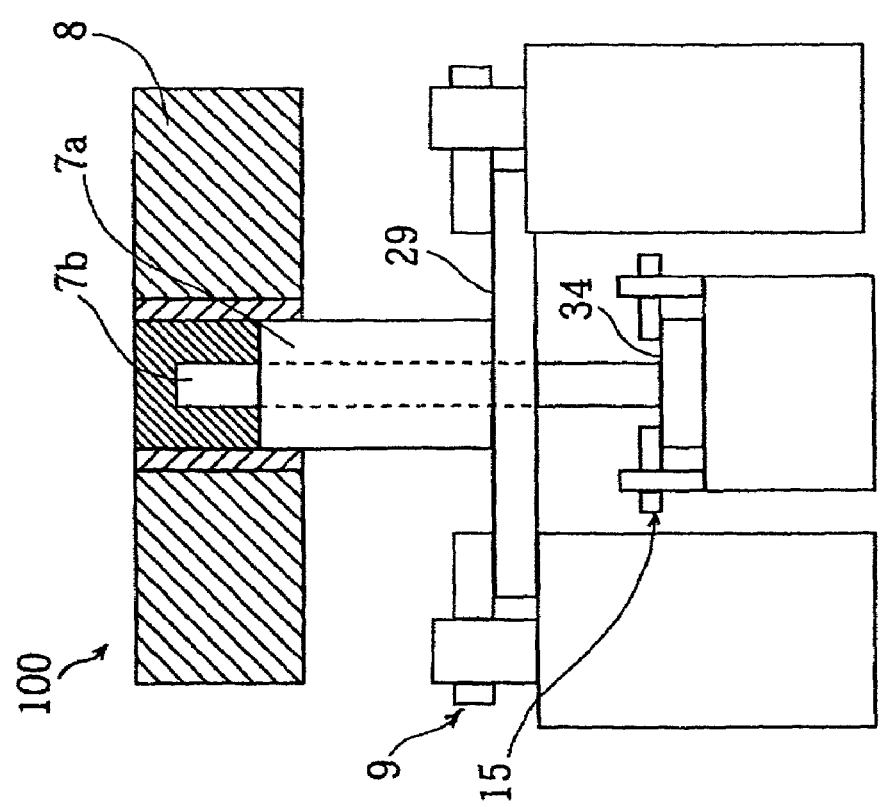
Figure 8:
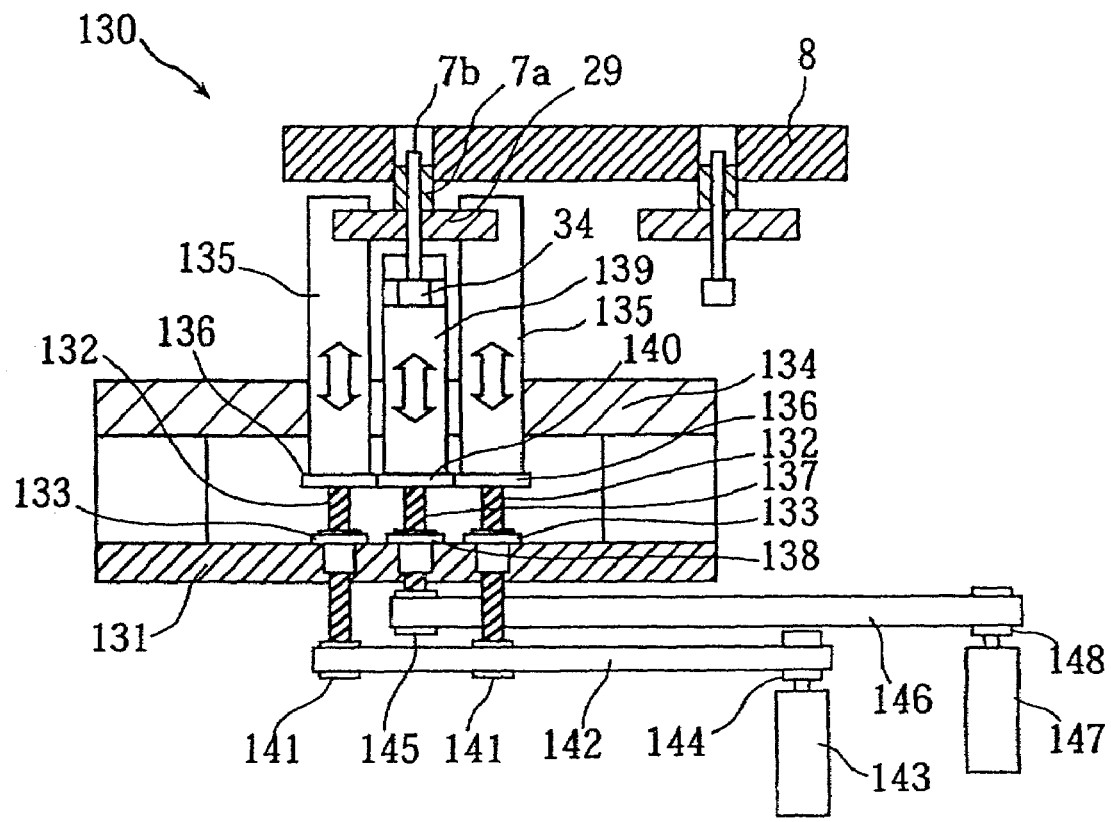
FIG. 8 illustrates the structure of a formed-product removing mechanism of the dry forming apparatus.

FIGS. 1 to 9 show a powder press forming apparatus according to an embodiment of the present invention and a method of powder press forming using the apparatus. FIG. 1 schematically shows the structure of the powder press forming apparatus. FIG. 2 is a plan view illustrating the rotational operation of a carrying table. FIG. 3 is a plan view of a connecting mechanism. FIG. 4 is a front view of a lower punch unit which is clamped. FIG. 5 is a front view of the lower punch unit which is uncamped. FIGS. 6, 7A, and 7B illustrate a charging-driving mechanism. FIGS. 8, 9A, and 9B illustrate a taking-out driving mechanism.

These figures show a powder press forming apparatus 1 for pressing a powdery ceramic raw material to produce a ceramic electronic component. The powder press forming apparatus 1 includes dies 5 each having a space in which powder is formed, molds 2 including an upper punch unit 6 and lower punch units 7, a disk-shaped carrying table (mold-transfer mechanism) 8 which is rotationally moved between a powder supply stage A, a pressing stage B, a machining stage C, and a formed product removing stage D, a charging-driving mechanism 100 for forming a powder-charge space in the powder supply stage A, a pressing-driving mechanism 3 for pressing the powdery ceramic raw material, a taking-out driving mechanism 130 for removing a formed product in the formed product removing stage D, and first and second connecting mechanisms 9 and 15 for detachably locating the lower punch unit 7 at the predetermined positions and detachably fixing the lower punch unit 7 and, moreover, a unit-holding mechanism 4 for detachably holding the lower punch unit 7 on the carrying table 8 in each of the stages A to D.

The dies 5 are arranged every 90° interval in the peripheral portion of the carrying table 8. The upper punch unit 6 includes a cylindrical first upper-punch 6a and a pin-shaped second upper-punch 6b which is relatively rotatably inserted into the punch 6a. Also, the lower punch unit 7 includes a cylindrical first lower-punch 7a and a pin-shaped second lower-punch 7b which is relatively rotatably inserted into the first punch 7a. The upper punch unit 6 is provided only in the pressing driving mechanism 3 disposed in the pressing stage B. The lower punch unit 7 is disposed on the lower surface of each die 5 of the carrying table 8.

The charging-driving mechanism 100 is disposed in the powder supply stage A, and has the following structure as shown in FIG. 6, 7A, and 7B. A stationary base 101 is disposed and secured under the carrying table 8 so that it can not be moved. Ball screws 102 and 102 for the first lower-punch 7a are rotatably supported in bearings 103 and 103, respectively. Each bearing 103 is fixed to the stationary base 101. The ball screws 102 and 102 are inserted into struts 105 and 105 for the first lower-punch 7a, which are slidably supported on a supporting bench 104, and are screwed into nuts 106 and 106 inserted into and fixed to the lower end portions of the struts 105 and 105, respectively.

The upper ends of the struts 105 and 105 are detachably connected to a mold-supporting plate 29 for the first lower-punch 7a via a first connecting means 9 which will be described later. The first lower-punch 7a is fixed to the upper surface of the mold supporting plate 29. Thereby, the first lower-punch 7a, together with the struts 105 and 105, can be vertically moved by rotating the ball screws 102 and 102.

A ball screw 107 for the second lower punch 7b between the ball screws 102 and 102 for the first lower-punch 7a is rotatably supported on the stationary base 101 via a bearing 108. The bearing 108 is fixed to the stationary base 101. The ball screw 107 is inserted into a strut 109 which slidably supports the second lower-punch 7b, and is screwed into a nut 110 inserted into and fixed to the lower end portion of the lower second strut 109.

A mold-supporting plate 34 for the second lower-punch 7b is detachably connected to the upper end portion of the strut 109 via a second connecting means 15 which will be described later. The second lower-punch 7b is fixed to the upper surface of the mold supporting plate 34. The second lower-punch 7b is vertically moved by rotation of the ball screw 107 for the second lower-punch 7b.

A timing belt 113 for the first lower-punch 7a is made to pass over driven pulleys 112 for the ball screws 102 for the first lower-punch 7a, and is made to pass over a driving pulley 115 attached to a servomotor 114 for the first lower-punch 7a. The first lower-punch 7a, together with both of the struts 105, is vertically moved by rotation of the servomotor 114.

A timing belt 117 for the second lower-punch 7b is made to pass over a driven pulley 116 for the ball screw 107 for the second lower-punch 7b, and is made to pass over a driving pulley 119 attached to a servomotor 118 for the second lower-punch 7b. The second lower-punch 7b is vertically moved together with the struts 109 by rotation of the servomotor 118. The servomotors 114 and 118 are fixed to the stationary base 102 via brackets or the like, respectively.

The first lower punches 7a and the second lower punch 7b are independently driven by the servomotors 114 and 118 to form a space to be charged with powder. For example, powder can be charged to produce a formed product having a cylindrical shape, a columnar shape, an H-character shape in the longitudinal cross section, or a cross shape in the longitudinal cross section. That is, the ball screws 102 for the first lower-punch 7a and the ball screw 107 for the second lower-punch 7b are rotated so that the first lower punch 7a and the second lower punch 7b are lowered to a degree corresponding to the quantity of charged powder. Thereafter, powder is supplied, and moreover, the ball screws 102 and 107 are rotated so that the first and second lower-punches 7a and 7b are lowered to a slight degree. Thus, the charging of the powder is completed.

Figure 9B:
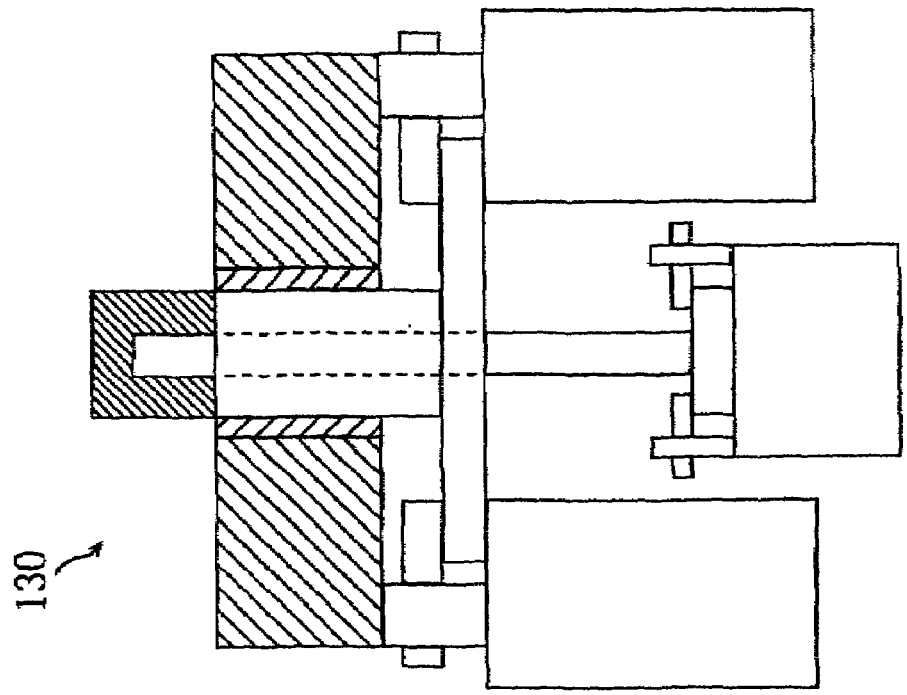
FIGS. 9A and 9B illustrate the operation of the formed-product removing mechanism.
Figure 9A:
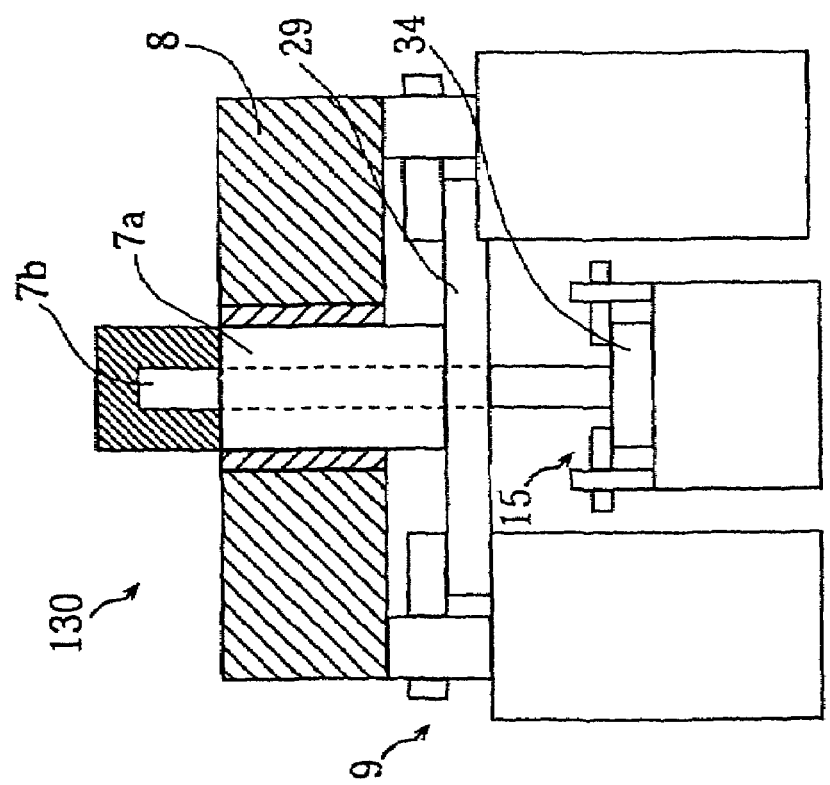

The taking-out driving mechanism 130 is disposed in the formed product removing stage D, and has the following structure as shown in FIGS. 8, 9A, and 9B. A stationary base 131 is disposed and secured under the carrying table 8 so that it can not be moved. The ball screws 132 and 132 for the first lower-punch 7a are rotatably supported by the stationary base 131 via bearings 133 and 133, respectively. Each bearing 133 is fixed to the stationary base 131. The ball screws 132 and are inserted into struts 135 and 135 for the first lower-punch 7a, which are slidably supported on a supporting bench 104, and are screwed into nuts 136 and 136 inserted into and fixed to the lower end portions of the first lower struts 135 and 135, respectively.

The mold-supporting plate 29 for the first lower-punch 7a is detachably connected to the upper ends of the struts 135 and 135 via the first connecting means 9 which will be described later. The first lower-punch 7a is fixed to the upper surface of the mold-supporting plate 29.

A ball screw 137 for the second lower-punch 7b is rotatably supported between the ball screws 132 for the first power-punch 7a by the stationary base 131 via a bearing 138. The bearing 138 is fixed to the stationary base 131. The ball screw 137 is inserted into a slidably supported strut 139 for the second lower-punch 7b, and is screwed into a nut 140 inserted into and fixed to the lower end portion of the strut 139.

The mold-supporting plate 34 for the second lower-punch 7b is detachably connected to the upper end portion of the strut 139 for the second lower-punch 7b via the second connecting means 15 which will be described later. The lower second punch 7b is fixed to the upper surface of the mold-supporting plate 34.

A timing belt 142 for the first lower-punch 7a is made to pass over driven pulleys 141 for the ball screws 132 for the first lower-punch 7a. The timing belt 142 is made to pass over a driving pulley 144 attached to a servomotor 118 for the first lower-punch 7a.

A timing belt 146 for the second lower-punch 7b is made to pass over a driven pulley 145 for the screw 137 for the second lower-punch 7b. The timing belt 146 is made to pass over a driving pulley 148 attached to a servomotor 147 for the second lower-punch 7b. The operation of the taking-out driving mechanism 130 is similar to that of the charging driving mechanism 100. The repeated description is omitted.

A formed product can be taken out by independently moving the first and second lower punches 7a and 7b by means of the servomotors 143 and 147. In particular, only the second lower punch 7b, which is in the state shown in FIG. 9A, is moved downward by rotation of the second lower ball screw 137, and is extracted from the formed product as shown in FIG. 9B. The taking-out of the formed product is performed by means of another device not shown.

The pressing driving mechanism 3 is disposed in the pressing stage B shown in FIG. 2, and has the following structure. A driving base 10 is disposed under the carrying table 8 in such a manner that the base 10 can be vertically moved. A stationary base 11 is fixed under the driving base 10 so that the base 11 can not be moved. Ball screws 12 and 12 for the first upper-punch 6a which constitute drive shafts are rotatably supported to the stationary base 11 via bearings 13 and 13. Each bearing 13 is fixed to the stationary base 11. The ball screws 12 and 12 are screwed into nuts 14 and 14 fixed to the driving base 10, respectively.

A supporting bench 17 having an inverted U-shape is fixed to the driving base 10. Struts 18 and 18 for the first upper-punch 5a, having a cylindrical shape, which constitutes the other drive shafts, are disposed on the upper surface of the supporting bench 10 so as to stand vertically thereon. A mold-supporting plate 19 for the first upper-punch 6a is fixedly connected to the upper ends of the struts 18. The first upper punch 6a is fixedly attached to the lower surface of the mold-supporting plate 19. The first upper-punch 6a, together with the driving base 10 and the struts 18, is vertically moved by rotation of the ball screws 12 for the first upper-punch 6a.

Ball screws 21 and 21 for the second upper punch 6b are rotatably supported to the driving base 10 via bearings 22 and 22. Each bearing 22 is fixed to the driving base 10. The ball screws 21 and 21 are inserted into struts 16 and 16 for the second upper-punch 6b. The struts 16 and 16 are slidably supported to the supporting bench 17. The ball screws 21 are screwed into nuts 23 inserted into and fixed to the upper end portions of the struts 16, respectively. A mold-supporting plate 20 for the second upper-punch 6b is extended between the upper end portions of the struts 16 and 16 to be fixed thereto. The second upper punch 6b is fixed to the lower surface of the mold supporting plate 20. The second upper-punch 6b, together with the struts 16 and 16, is vertically moved by rotation of the ball screws 21.

Ball screws 25 and 25 for the first lower-punch 7a are rotatably supported to the driving base 10 via bearings 26 and 26, respectively. Each bearing 26 is fixed to the driving base 10. The ball screws 25 are inserted into struts 27 for the first lower-punch 7a, respectively. The struts 27 are slidably supported by the supporting bench 17. The ball screws 25 are inserted into the lower end portions of the struts 27, and are screwed into nuts 28 and 28 which are inserted into and fixed to the lower end portions of the struts 27, respectively.

A mold-supporting plate 29 for the first lower-punch 7a is detachably connected to the upper end portions of the struts 27 via the first connecting mechanism 9. The first lower-punch 7a is fixed to the upper surface of the mold-supporting plate 29. Thereby, the first lower-punch 7a is vertically moved together with the struts 27 by rotation of the ball screws 25.

A ball screw 30 for the second lower-punch 7b is supported between the ball screws 25 and 25 on the driving base 10 via bearings 31 and 31, respectively. The bearings 31 and 31 are fixed to the driving base 10. The ball screw 30 is inserted into a strut 32 for the second lower-punch 7b and slidably supported on the supporting bench 17, and, moreover, is screwed into a nut 33 inserted into and fixed to the lower end portion of the strut 32.

A mold-supporting plate 34 for the second lower-punch 7b is detachably connected to the upper end portions of the strut 32 via the second connecting mechanism 15. The second lower-punch 7b is fixed to the upper surface of the mold supporting plate 34. The second lower-punch 7b is vertically moved together with the strut 32 by rotation of the ball screw 30. Thus, all of the ball screws 12, 21, 25, and 30 are concentrated in the driving base 10.

The ball screws 21 and 21 for the second upper-punch 6b and the ball screws 25, 25, and 30 for the first and second lower-punches 7a and 7b, respectively, are inserted and protrude downwardly through the driving base 10. Driven pulleys 37, 44, 44, and 45 are mounted onto these protuberances, respectively.

A timing belt 38 for the second upper-punch 6b is made to pass over the driven pulleys 37 for the ball screws 21 for the second upper-punch 6b, and is made to pass over a driving pulley 40 mounted onto a servomotor 39 for the second upper-punch 6b. Thereby, the second upper-punch 6b is vertically moved together with the struts 16 by rotation of the servomotor 39.

A timing belt 46 for the first lower-punch 7a is made to pass over the driven pulleys 44 for the ball screws 25, and is made to pass over a driving pulley 48 mounted onto the a servomotor 47 for the first lower-punch 7a. The first lower-punch 7a is vertically moved together with the struts 27 by rotation of the servo motor 47.

A timing belt 49 for the second lower-punch 7b is made to pass over the driven pulley 45 for the ball screw 30, and is made to pass over a driving pulley 51 of a servo motor 50 for the second lower-punch 7b. The second lower-punch 7b is vertically moved together with the strut 32 by rotation of the servomotor 50.

The ball screws 12 for the first upper-punch 6a are inserted through the stationary base 11 to protrude downward. Driven pulleys 43 and 43 are mounted onto the protuberances, respectively. A timing belt 52 for the first upper-punch 6a is made to pass over the driven pulleys 43, and is made to pass over a driving pulley 54 mounted onto a servomotor 53 for the first upper-punch 6a.

The servomotors 53, 39, 47, and 50 are arranged in a concentration near the driving base 10. The servomotor 53 is fixed to the stationary base 11, and the servomotors 39, 47, and 50 are fixed to the driving base 10, via a bracket or the like, respectively.

The first and second upper-punches 6a and 6b and the first and second lower-punches 7a and 7b are independently driven by the servomotors 53, 39, 47, and 50, and thereby, products having different shapes and a uniform density can be produced. For example, products having a cylindrical shape, a columnar shape, a H-shape in cross section, or a cross shape in longitudinal cross section can be formed. In particular, the first and second upper-punches 6a and 6b are lowered by rotation of the ball screws 12 and 21. The first and second lower-punches 7a and 7b are raised by rotation of the ball screws 25 and 30. Thereby, compression-forming is carried out. In this case, the descent of the first and second lower-punches 7a and 7b caused by the lowering of the driving base 10 is compensated for by the ball screws 25 and 30 rotated to a degree required for the compression and, further, raising the lower punches 7a and 7b corresponding to the rotation degree of the ball screws 12.

Moreover, the servomotor 53 for the first upper-punch 6a is rotated while the rotation of the servomotor 39 for the second upper-punch 6b and the servomotors 47 and 50 for the first and second lower-punches 7a and 7b are stopped. Thereby, the first and second upper-punches 6a and 6b and the first and second lower-punches 7a and 7b, together with the driving base 10, are synchronously moved vertically. Thus, the formed product can be removed from the carrying table 8 while the distance between the punches is maintained. That is, after the pressing is completed, the servomotor 39 and the servomotors 47 and 50 are stopped, and thereby, the ball screws 21 and the ball screws 25 and 30 are fixed. In this state, the ball screws 12 are rotated by the servomotor 53. Thus, the driving base 10 is raised, which cause the first and second upper-punches 6a and 6b and the first and second lower-punches 7a and 7b to rise while the distances between these punches are maintained.

A rotation driving mechanism (not shown) is externally connected to the carrying table 8. The carrying table 8 transfers the die 5 and the lower punch units 7 to the powder supply stage, the powder pressing stage B, the machining stage C, and the formed product removing stage D sequentially in that order.

A powder charging apparatus (not shown) for automatically charging a powdery raw material into the die 5 (not shown) is disposed in the powder supply stage A. A take-up apparatus (not shown) for automatically removing a formed product from the mold and recovering the product is disposed in the formed-product removing stage D. Since the powder charging apparatus and the taking-out apparatus are provided, continuous production can be realized by automation. Moreover, production costs can be reduced.

After the powdery ceramic raw material is charged into the die 5 positioning in the powder supply stage A, the carrying table 8 is rotated by 90° in the direction shown by the arrow a. Thereby, the die 5 having the powdery ceramic raw material filled therein and the lower punch unit 7 are transferred to the pressing stage B, where pressing is carried out by means of the upper and lower punch units 6 and 7. At this time, powdery ceramic raw material is charged into the succeeding die 5 transferred to the powder supply stage A.

After pressing, the carrying table 8 is rotated by 90° so that the pressed product is transferred to the machining stage C, where cutting, drilling, deburring, or the like is carried out. At this time, the succeeding powdery ceramic is formed by pressing in the pressing stage B. In the powder supply stage A, powdery ceramic is charged in the further succeeding die 5.

After any desired machining is completed in the machining stage C, the carrying table 8 is rotated by 90°, so that the machined-formed product is transferred to the stage D, where the formed product is taken out, and is recovered in a predetermined place. Thereafter, the empty die 5 is transferred to the powder supply stage A again. The carrying table 8 is rotated sequentially as described above, whereby the formed products are continuously obtained.

Moreover, a cleaning stage for removing the powdery raw material adhering to the die 5 and the lower punch unit 7 may be provided between the formed-product removing stage D and the powder supply stage A. In this case, a separate cleaning process can be omitted.

The above-described first and second connecting mechanisms 9 and 15 are arranged in each of the stages A to D, and clamp the mold-supporting plates 29 and 34 for the first and second lower punches 7a and 7b to locate the mold at the predetermined position in each of the stages A to D. For transfer, the clamping is released.

With reference to FIGS. 4 and 5, the first connecting mechanism 9 includes a clamp body 60 fixed to the upper ends of the struts 27 for the first lower-punch 7a and sliding claws 61 which are supported on the clamp body 60 so that they can advance or recede in the horizontal direction (perpendicular to the pressing direction). Each sliding claw 61 can advance or recede between the clamping position and the unclamping position. In the clamping position, the sliding claw 61, slid on the upper surface of the mold-supporting plate 29, fixedly locates the mold-supporting plate 29. In the unclamping position, the receded sliding claw 61 releases the fixing of the mold-supporting plate 29. Moreover, a clamp sensor 62 for sensing the clamping and unclamping positions of the sliding claw 61 is arranged on the upper surface of the mold-supporting plate 29.

Again with reference to FIGS. 4 and 5, the second connecting mechanism 15 includes a pair of clamping bodies 63 and 63 fixed onto the upper end face of the strut 32 for the second-lower punch 7b in opposition to each other, and sliding claws 64 and 64 supported by the clamping bodies 63 and 63 so that the claws 64 and 64 can advance or recede in the horizontal direction. Each sliding claw 64 can be driven so as to advance or recede between the clamping position and the unclamping position by an air cylinder mechanism not shown, similarly to the sliding claws 61. The sliding claw 64 fixedly locates the mold-supporting plate 34 for the second lower-punch 7b in the clamping position, and releases the fixing of the mold-supporting plate 34 in the unclamping position.

The unit holding mechanisms 4 hold the mold-supporting plates 29 and 34 for the lower punch unit 7 in the above-described fixed positions while the carrying table 8 is moved. In the predetermined position of each of the stages A to D, the mold-supporting plates 29 and 34 release the holding of the lower punch unit 7. Thus, the first and second lower-punches 7a and 7b can be vertically moved.

A pair of first air cylinder members 65 and 65 are fixedly attached to the under surface of the carrying table 8 in the positions thereof from which the members 65 and 65 face the first lower-punch 7a, respectively. The pistons 65a and 65a of the cylinder members 65 advance to sandwich and hold the first lower-punch 7a, and recede to release the sandwiching and holding.

A pair of second air cylinder members 66 and 66 are fixedly attached to the under surface of the mold-supporting plate 29 in the positions thereof from which the members 66 and 66 face the second lower-punch 7b, respectively. The pistons 66a and 66a of the cylinder members 66 and 66 advance to sandwich and hold the second lower-punch 7b, and recede to release the sandwiching and holding.

The operation of the unit holding mechanisms 4 and the first and second connecting mechanisms 9 and 15 will be described below. The first and second lower-punches 7a and 7b, held by the pistons 65a and 66a of the respective air cylinder members 65 and 66, are transferred, e.g., from the powder supply stage A to the pressing stage B. Then, the struts 27 and 32 are raised to contact with the mold-supporting plates 29 and 34 for the first and second lower-punches 7a and 7b to stop, respectively. Then, the sliding claws 61 and 64 advance to clamp the mold-supporting plates 29 and 34 to fixedly locate them, respectively. Simultaneously, a clamp signal output from the clamp sensor 62 causes the pistons 65a and 66a of the air cylinder members 65 and 66 to recede so that the holding of the first and second lower punches 7a and 8b is released. In this state, the upper and lower punch units 6 and 7 are vertically moved for the pressing operation described above.

After the pressing operation, the sliding claws 61 and 64 recede to release the clamping. Simultaneously with the releasing of the clamping, an unclamp signal output from the clamp sensor 62 causes the pistons 65a and 66a of the air cylinder members 65 and 66 to advance and hold the first and second lower-punches 7a and 7b in the above-described clamping positions. In this state, the punches 7a and 7b are transferred to the next machining stage C.

In the pressing apparatus 1 of this embodiment, the first and second lower-punches 7a and 7b are connected to the struts 27 and 32 by means of the first and second connecting mechanisms 9 and 15, respectively. Thus, the lower punch unit 7 are desirably positioned so that requirements for molds having different shapes and sizes can be coped with, and the flexibility of forming processes can be enhanced, and continuous production of different types of products can be realized.

When the lower punch unit 7 is transferred, the clamping by the first and second connecting mechanisms 9 and 15 are released, and also, the unit 7 is held at the clamping positions by means of the air cylinder members 65 and 66. Accordingly, the punches 7a and 7b can be transferred with the positional accuracy being maintained on a high level. Moreover, the punches 7a and 7b can be prevented from shifting or falling.

In this embodiment, the lower punch unit 7 is connected to the charging driving mechanism 100 via the connecting mechanisms 9 and 15 in the powder supply stage A, respectively. Thus, the space to be filled with powder can be formed easily and highly accurately, and moreover, the unit 7 can be prevented from falling during transfer. Furthermore, the lower punch unit 7 is connected to the taking-out driving mechanism 130 via the connecting mechanisms 9 and 15 in the formed-product removing stage D. Thus, the formed product can be easily taken out without damages to the formed product, and the product during transferring can be prevented from falling.

The first and second connecting mechanisms 9 and 15 are fixedly arranged on the struts 27 and 32 for the first and second lower-punches 7a and 7b, which operate as driving shafts. Thus, pressing can be carried out continuously with the clamping of the lower punch unit 7. Moreover, the sliding claws 61 and 64 of the connecting mechanisms 9 and 15 are made to advance and clamp the first and second lower-punches 7a and 7b, respectively. Thus, the lower punch unit 7 can be located with the simple structure.

In this embodiment, the first and second upper-punches 6a and 6b and the first and second lower-punches 7a and 7b are independently driven. Thus, a press-formed product having a uniform density can be formed. Moreover, the flexibility of the shape and size of the product can be enhanced. Moreover, the upper and lower punch units 6 and 7 are driven via the ball screws 12, 21, 25, and 30 and the timing belts 52, 38, 46, and 49. Accordingly, the frictional drag at driving can be reduced, and moreover, backlash can be suppressed. Furthermore, the qualities and dimensional accuracy of formed products can be enhanced.

Moreover, in this embodiment, the clamping operation of the first and second connecting mechanisms 9 and 15 are detected by the clamping sensor 62. The holding of the lower punch unit 7 by the air cylinder members 65 and 66 is released, interlocking with the clamping operation, and the lower punch unit 7 is held, interlocking with the unclamping operation. Thus, the lower punch unit 7 can be transferred to the next stage while the unit 7 is held at the clamping position. The positional accuracy of the lower punch unit 7 can be maintained on a high level.

In this embodiment, the first upper-punch 6a is fixed to the driving base 10 via the struts 18 and 18. The driving base 10 is supported by the ball screws 12 and 12 for the first upper-punch 6a so that it can be vertically moved. The remaining ball screw 21 for the second upper-punch 6b, and the ball screws 25 and 30 for the first and second lower-punches 7a and 7b are mounted onto the driving base 10. Moreover, the second upper-punch 6b and the first and second lower-punches 7a and 7b are independently driven by means of the ball screws 21, 25, and 30. Thus, at pressing, the powdery ceramic raw material can be compression-formed by means of the first and second upper punches 6a and 6b and the first and second lower punches 7a and 7b via the ball screws 12, 21, 25, and 30. Thus, products each having a uniform compression density can be formed.

Moreover, to release the formed product from the mold, the driving base 10 is raised via the ball screw 12 while the ball screws 21, 25 and 30 are fixed, and thereby, the first and second upper-punches 6a and 6b and the first and second lower-punches 7a and 7b are raised at the same time. Thus, the formed product can be released from the die 5 while the spacing between the punches is kept constant. Accordingly, the structures of the apparatuses for supplying powder and taking out the formed product can be simplified. Thus, the cost can be suppressed.

In this embodiment, all the ball screws 12, 21, 25, and 30 are concentratedly arranged in the driving base 10, and moreover, the servomotors 53, 39, 47, and 50 are concentratedly arranged around the driving base 10 and the stationary base 11. Thus, the built-in accuracies of the ball screws 12, 21, 25, and 30 and the servomotors 53, 39, 47, and 50 can be enhanced by providing a reference surface on the driving base 10. Moreover, build-in work and maintenance can be easily performed. Furthermore, the pressing and driving systems are concentratedly arranged on the driving base 10 under the carrying table 8. Thus, the height of the whole apparatus can be reduced, which contributes to the reduction in size thereof.

Figure 10:
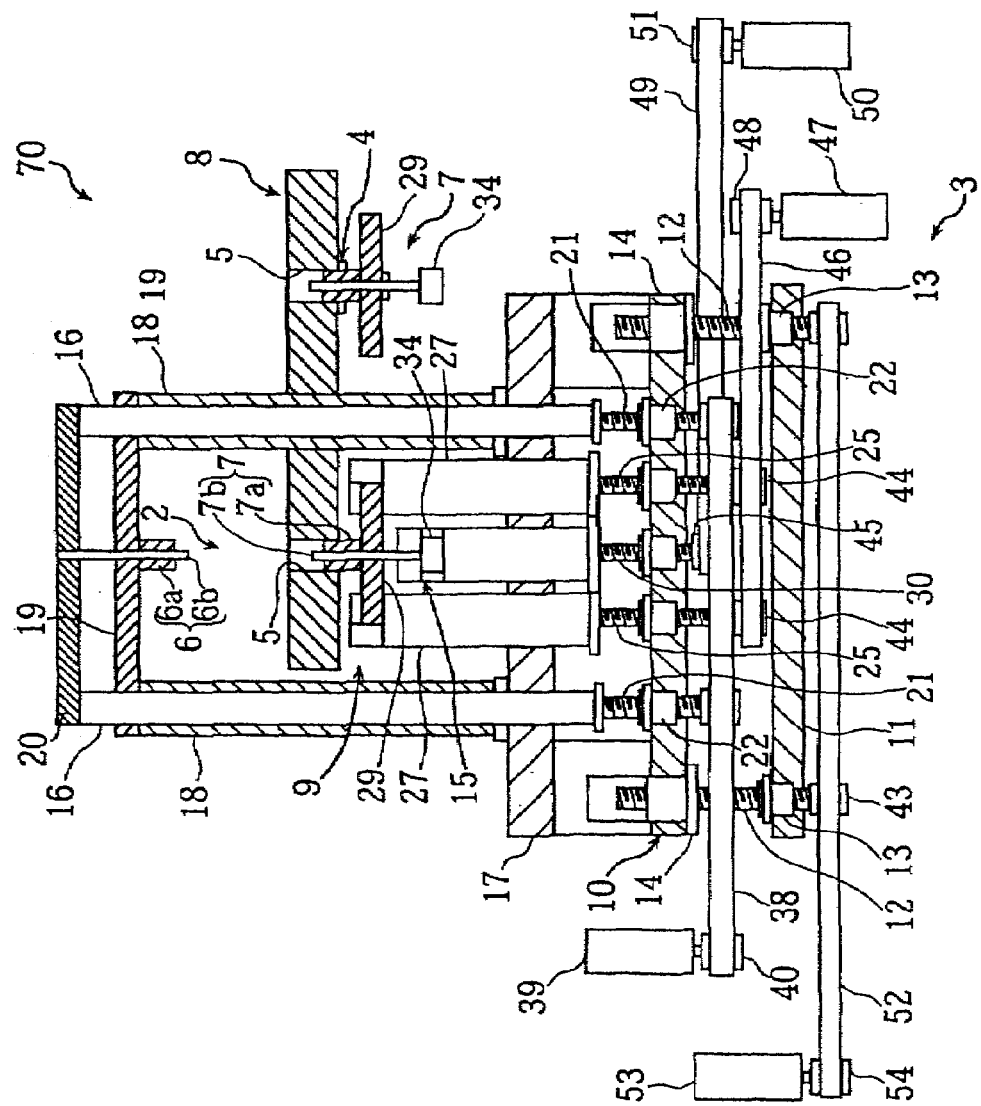
FIG. 10 schematically shows the structure of a dry forming apparatus according to a second embodiment of the present invention.

FIG. 10 illustrates a powder pressing apparatus according to a second embodiment of the present invention. In FIG. 10, the same or equivalent parts to those in FIG. 1 are designated by the same reference numerals.

The powder press forming apparatus 70 of this embodiment includes the dies 5, the molds 2 including the upper punch unit 6 and the lower punch units 7, the carrying table 8 which is rotated and moved between the powder supply stage A, the pressing B, the machining stage C, and the formed-product removing stage D, the pressing driving mechanism 3 for pressing a powdery ceramic raw material, the first and second connecting mechanisms 9 and 15 for detachably locating and securing the lower punch unit 7 in the predetermined position in each of the stages A to D, and the unit holding mechanism 4 for detachably holding the lower punch unit 7 on the carrying table 8. The basic structure is the same as that of the first embodiment. Thus, only the differences between the first and second embodiments will be described below.

The struts 18 and 18 connected to the first upper-punch 6a each have a cylindrical shape. The struts 16 and 16 connected to the second upper-punch 6b are inserted into the struts 18 so as to be coaxial with the struts 18, respectively. The struts 18 and 16 can be relatively moved.

In this embodiment, the struts 16 for the second upper-punch 6b are relatively-movably inserted into the struts 18 for the first upper-punch 6a in such a manner as to be coaxial therewith. Thus, the width in the transverse direction of the driving base 10 can be reduced compared to the parallel arrangement of the struts. Thus, the whole apparatus can be reduced in size.

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A dry forming apparatus comprising:
 a mold-transfer mechanism for transferring a mold support plate, containing a die and lower punch units, at least between a powder supply stage, a pressing stage, and a formed-product removing stage;
 a pressing driving mechanism, having upper punch units which are not transferable between stages, for driving the upper and lower punch units for pressing in the pressing stage;
 a connecting mechanism for connecting lower punch units to the pressing driving mechanism when the mold support plate is transferred to the pressing stage, and for releasing the connection of the lower punch units; and
 a unit holding mechanism for holding the lower punch units while the lower punch units are transferred to the next stage,
 wherein the connecting mechanism comprises:
 clamp bodies fixed to each of the pressing driving mechanism, the charging driving mechanism, and the taking-out driving mechanism;
 sliding claws movably supported on each of the clamp bodies; and
 an advancing-receding driving mechanism which advances or recedes each of the sliding claws between a clamping position at which the punch units are clamped and an unclamping position at which the clamping is released.

2. A dry forming apparatus according to claim 1, further comprising in the powder supply stage:
 a charging driving mechanism for driving the punch units to form a space to be filled with powder in the powder supply stage;
 a connecting mechanism for connecting the punch units to the charging driving mechanism when the mold is transferred to the powder supply stage, and for releasing the connection of the punch units when the mold is transferred to the next stage;
 a unit holding mechanism for holding the punch units while the mold is transferred to the next stage;
 a lower punch unit including at least first and second lower-punches; and
 the charging driving mechanism and the taking-out driving mechanism each including driving shafts connected to the first and second lower-punches and actuators which independently drive the driving shafts.

3. A dry forming apparatus according to claim 1, further comprising in the formed-product removing stage:
 a taking-out mechanism for driving the punch units in the formed-product removing stage, to take out the formed product;

a connecting mechanism for connecting the punch units to the taking-out driving mechanism when the mold is transferred to the formed-product removing stage, and for releasing the connection of the punch units when the mold is transferred to the next stage; and a unit holding mechanism for holding the punch units while the mold is transferred to the next stage.

4. A dry forming apparatus according to claim 1, wherein the connecting mechanism is provided for each of the pressing driving mechanism, the charging driving mechanism, and the taking-out driving mechanism; and whereby the punch units are driven by the pressing driving mechanism, the charging driving mechanism, and the taking-out driving mechanism via the connecting mechanism.

5. A dry forming apparatus according to claim 1, further comprising:

punch units and a die;

wherein the punch units each include an upper punch unit including at least first and second upper-punches, and a lower punch unit including at least first and second lower-punches, the upper and lower punch units being opposed to each other across the die, and the pressing driving mechanism includes driving shafts connected to the first and second upper-punches and the first and second lower-punches, respectively, and actuators which independently drive the driving shafts.

6. A dry forming apparatus according to claim 5, wherein each driving shaft includes a strut and a ball screws screwed into the strut, each punch unit being connected to the strut, and the actuator being connected to the ball screw.

7. A dry forming apparatus according to claim 5, wherein each actuator includes a servomotor and a timing belt, the timing belt positioned so that rotation of the servomotor is transmitted to the ball screw via the timing belt.

8. A dry forming apparatus according to claim 5, wherein at least the driving shafts for the first and second upper punches each include a coaxial multi-shaft structure including an inner cylinder and an outer cylinder, the inner cylinder inserted into the outer cylinder relatively movably in the axial direction, wherein the first and second upper-punches can be independently driven by the relative movement of the outer and inner cylinders.

9. A dry forming apparatus according to claim 1, wherein the mold-transfer mechanism includes a rotary table, the mold being transferred to any one of the stages by rotation of the rotary table.

10. A dry forming apparatus according to claim 1, wherein the mold-transfer mechanism includes a linear table, the mold being transferred to any one of the stages by linear movement of the linear table.

11. A dry forming apparatus according to claim 1, wherein the unit-holding mechanism is configured and arranged to hold the punch units, to cooperate with the clamp-releasing operation when the connecting mechanism releases the clamping of the punch units, and to cooperate with the clamping operation when the connecting mechanism clamps the punch units to release the holding of the punch units.

12. A dry forming apparatus according to claim 1, further comprising:

a powder charging mechanism in the powder supply stage for charging a powdery raw material into the space to be dry-formed of the die; and a formed-product taking-out mechanism in the formed-product removing stage for taking out a press-formed product from the mold.

13. A dry forming apparatus according to claim 1, further comprising:

a machining stage between the pressing stage and the formed-product removing stage for machining a pressing-formed product.

14. A dry forming apparatus according to claim 1, further comprising:

a cleaning stage next to the formed-product removing stage for removing powder adhering to the die and the punch units.

15. A dry forming apparatus according to claim 2 wherein each driving shaft includes a strut and a ball screws screwed into the strut, each punch unit being connected to the strut, and the actuator being connected to the ball screw.

16. A dry forming apparatus according to claim 2, wherein each actuator includes a servomotor and a timing belt, the timing belt positioned so that rotation of the servomotor is transmitted to the ball screw via the timing belt.

17. A dry forming apparatus according to claim 1, wherein upper punch units are provided only in the pressing driving mechanism.

* * * * *